United States Patent
Lee et al.

(10) Patent No.: US 10,174,899 B2
(45) Date of Patent: Jan. 8, 2019

(54) ASPHERICAL LENS MODULE FOR A HEADLAMP

(71) Applicant: HYUNDAI MOTOR COMPANY, Seoul (KR)

(72) Inventors: Seong Hoon Lee, Suwon-si (KR); Kyu Geol Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 162 days.

(21) Appl. No.: 15/378,838

(22) Filed: Dec. 14, 2016

(65) Prior Publication Data
US 2018/0106452 A1     Apr. 19, 2018

(30) Foreign Application Priority Data

Oct. 14, 2016   (KR) .................. 10-2016-0133703

(51) Int. Cl.

| | | |
|---|---|---|
| *F21V 5/02* | (2006.01) | |
| *F21V 5/08* | (2006.01) | |
| *F21S 41/275* | (2018.01) | |
| *F21S 41/255* | (2018.01) | |
| *F21S 41/29* | (2018.01) | |
| *B60Q 1/00* | (2006.01) | |
| *F21S 43/20* | (2018.01) | |

(Continued)

(52) U.S. Cl.
CPC .......... *F21S 41/275* (2018.01); *B60Q 1/0052* (2013.01); *F21S 41/255* (2018.01); *F21S 41/29* (2018.01); *F21S 41/295* (2018.01); *F21S 43/26* (2018.01); *F21W 2102/13* (2018.01); *F21W 2103/10* (2018.01)

(58) Field of Classification Search
CPC ........ F21S 41/25; F21S 41/255; F21S 41/275; F21S 41/29; F21S 41/295; F21S 43/26; F21V 5/02; F21W 2102/00; F21W 2102/13; F21W 2103/10; G02B 3/04; G02B 5/04
See application file for complete search history.

(56) References Cited

U.S. PATENT DOCUMENTS

| | | | |
|---|---|---|---|
| 6,619,829 B1 * | 9/2003 | Chen .................... | B60Q 1/0052 362/544 |
| 7,086,759 B2 * | 8/2006 | Hartmann, Jr. .......... | F21S 8/04 362/311.02 |

(Continued)

FOREIGN PATENT DOCUMENTS

| | | |
|---|---|---|
| JP | 2004014122 | 1/2004 |
| JP | 2012099419 A | 5/2012 |

(Continued)

OTHER PUBLICATIONS

KR Office Action dated Sep. 26, 2017, Office Action in corresponding Korean Patent Application 10-2016-0133703, dated Oct. 14, 2016; 5 pages.

*Primary Examiner* — Peggy Neils
(74) *Attorney, Agent, or Firm* — Lempia Summerfield Katz LLC

(57) ABSTRACT

Disclosed is an aspherical lens module of a vehicle headlamp configured such that a position light function is added to the existing functions of a low beam or high beam without increasing the size of the lamp module. Further, the aspherical lens module of a headlamp is configured such that the quantity of required light of a low beam or high beam is not reduced when the position light function is added to them.

6 Claims, 2 Drawing Sheets

(51) Int. Cl.
*F21W 102/13* (2018.01)
*F21W 103/10* (2018.01)

(56) References Cited

U.S. PATENT DOCUMENTS

| | | | | |
|---|---|---|---|---|
| 7,144,144 B2 * | 12/2006 | Hsu | ...................... | B60Q 1/0052 |
| | | | | 362/543 |
| 7,147,356 B2 * | 12/2006 | Tamaki | ................ | G02B 6/0018 |
| | | | | 362/551 |
| 7,845,808 B2 * | 12/2010 | Lai | ......................... | G02B 6/001 |
| | | | | 362/23.08 |
| 2005/0162860 A1 * | 7/2005 | Su | ......................... | B60Q 1/0052 |
| | | | | 362/512 |
| 2016/0131323 A1 | 5/2016 | Youn et al. | | |

FOREIGN PATENT DOCUMENTS

| | | |
|---|---|---|
| JP | 2014175091 | 9/2014 |
| KR | 10199990063152 A | 7/1999 |
| KR | 20120059306 | 6/2012 |
| KR | 101248999 A | 4/2013 |
| KR | 20160054984 | 5/2016 |

* cited by examiner

ASPHERICAL LENS MODULE FOR A HEADLAMP

CROSS REFERENCE TO RELATED APPLICATION

The present application claims priority to Korean Patent Application No. 10-2016-0133703, filed Oct. 14, 2016, the entire contents of which is incorporated herein for all purposes by this reference.

BACKGROUND

Field of the Disclosure

The present disclosure relates to aspherical lens modules for vehicle headlamps.

Description of the Related Art

Generally, vehicles are provided with lamps to allow objects ahead of the vehicle to be seen during times of poor or reduced visibility, such as at night. Vehicle lamps also inform other vehicles or people using the road of the vehicle's presence. Headlamps, also referred to as headlights, light the road in front of vehicles and require enough brightness to identify obstacles on the road 100 m away during times of poor or reduced visibility, such as nighttime.

Conventional vehicle headlamps generally include a projection module mounted to a housing and a lens coupled to a circumferential surface of the housing. The projection module typically includes a reflector having a bulb and an aspherical lens provided in front of the reflector that emits light.

When power is supplied to a light source in the housing to turn the light source on, light generated from the light source is reflected by the reflector and emitted through an aspherical surface of the aspherical lens in a forward direction.

However, conventional aspherical lenses are not formed to be any particular shape and only function to emit light from a single light source through an elliptical optical system in a forward direction. Accordingly, sizes of lamp modules are typically increased in order to accommodate a position light function in addition to a low beam, a high beam, and a turn signal. Position lights may also be referred to as parking lights or daytime running lights. As a result, when a portion of the high beam reflector is used as the position light, high beam performance may be reduced.

The foregoing is intended merely to aid in the understanding of the background of the present disclosure. It is not intended to mean that the present disclosure falls within the purview of prior art that is already known to those of ordinary skill in the art.

SUMMARY

The present disclosure is directed to an aspherical lens module of a vehicle headlamp. The disclosed aspherical lens module is configured such that a position light function is added to the existing functions of a low beam or high beam without increasing the size of the lamp module. The disclosed aspherical lens module is also configured such that the quantity of required light of a low beam or high beam is not reduced when the position light function is added to them.

One embodiment of the present disclosure provides an aspherical lens module of a vehicle headlamp including: a lens holder including a mount hole penetrating through a front surface of the lens holder; at least one light source being provided along a circumferential surface of the mount hole; and an aspherical lens mounted to the mount hole of the lens holder. The aspherical lens is configured to allow light from the light source to be incident on an edge of the aspherical lens and to allow the incident light to travel along the edge of the aspherical lens by reflection. The edge of the aspherical lens includes a prism part to scatter the incident light. The prism part is disposed at a location along the edge of the aspherical lens upon which the light from the light source is incident. The prism part is configured to extend to a predetermined length and be notched from a rear surface thereof toward a front surface thereof to be triangular in shape.

In one embodiment of the present disclosure, the edge of the aspherical lens may include a light inlet protruding in a radial direction, with the light from the light source being incident on the light inlet.

The light source may emit light in a circumferential direction of the mount hole and the light inlet may allow the emitted light to be incident thereon by protruding from the edge of the aspherical lens.

In one embodiment of the present disclosure, the lens holder may include an assembly groove along a circumferential surface of the mount hole to allow insertion of the light inlet of the aspherical lens.

In one embodiment of the present disclosure, the edge of the aspherical lens may include a plurality of diffusion optic protrusions protruding along the edge of the aspherical lens.

In one embodiment of the present disclosure, the aspherical lens module may further include a locking rim configured to surround the aspherical lens. The locking rim may be mounted to the mount hole of the lens holder in such a way that the aspherical lens mounted to the mount hole is locked to the lens holder.

According to one embodiment of the present disclosure, an aspherical lens module of a vehicle headlamp is configured such that a position light function is added to the existing functions of a low beam or high beam without increasing the size of the lamp module.

Further, according to one embodiment of the present disclosure, the disclosed aspherical lens module is also configured such that the quantity of required light of a low beam or high beam is not reduced when the position light function is added to them.

BRIEF DESCRIPTION OF THE DRAWINGS

The above, as well as other objects, features and other advantages of the present disclosure will be more clearly understood from the detailed description below when taken in conjunction with the accompanying drawings, in which.

DETAILED DESCRIPTION OF THE EMBODIMENTS

Figure 1:
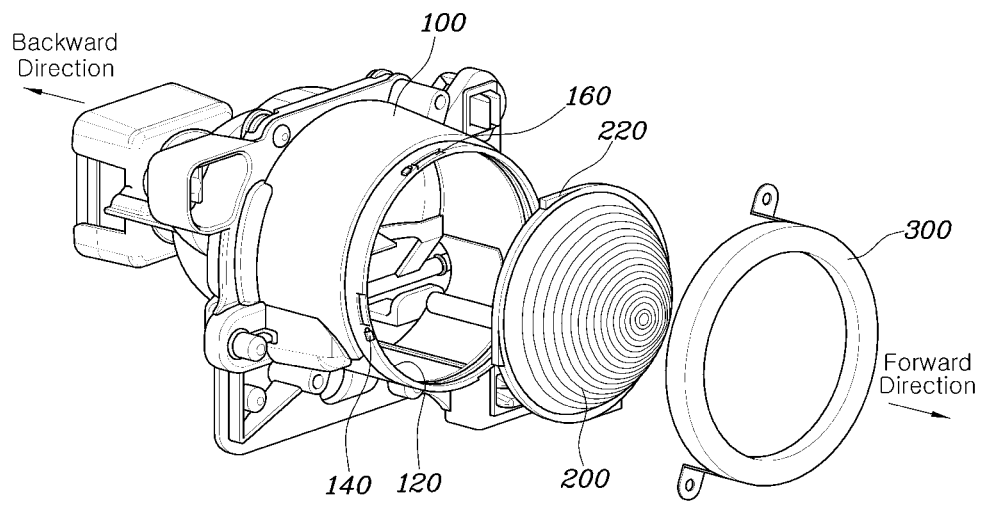
FIG. 1 is a view illustrating an aspherical lens module of a vehicle headlamp according to one embodiment of the present disclosure.

Hereinafter, embodiments of the present disclosure are described in detail with reference to the accompanying drawings. Throughout the drawings and specification, the same reference numerals will refer to the same or like parts.

Figure 2:
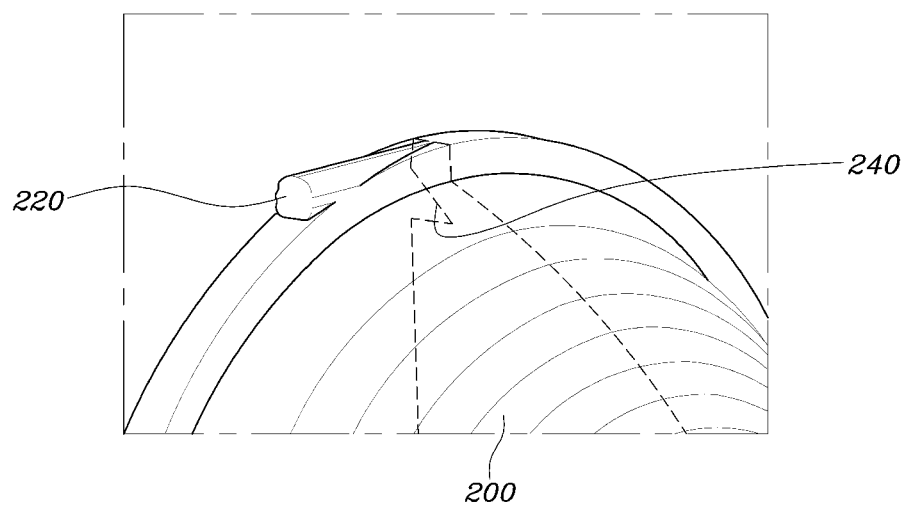
FIG. 2 is a front view illustrating the aspherical lens of FIG. 1 and according to one embodiment of the present disclosure.
Figure 3:
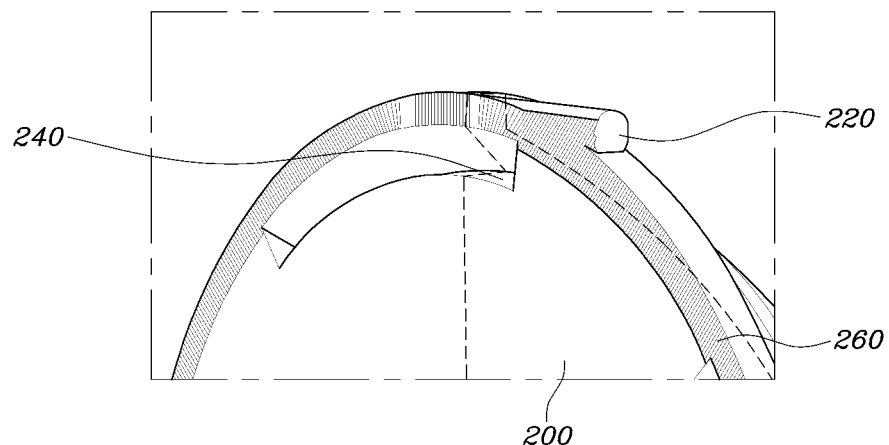
FIG. 3 is a rear view illustrating the aspherical lens of FIG. 1 and according to one embodiment of the present disclosure.
Figure 4:
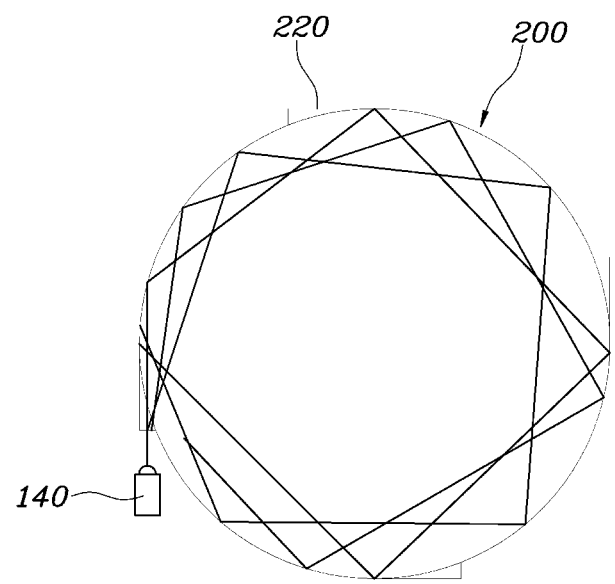
FIG. 4 is a view illustrating a light travel path for the aspherical lens of FIG. 1 and according to one embodiment of the present disclosure.

FIG. 1 is a view illustrating an aspherical lens module of a vehicle headlamp according to one embodiment of the present disclosure and FIGS. 2-4 are views illustrating various aspects of an aspherical lens of the aspherical lens module according to one embodiment of the present disclosure.

As shown in FIG. 1, an aspherical lens module of a vehicle headlamp according to one embodiment of the present disclosure includes: a lens holder 100 formed with a mount hole 120 through a front surface thereof; at least one light source 140 provided along a circumferential surface of the mount hole 120; and an aspherical lens 200 mounted to the mount hole 120 of the lens holder 100, the aspherical lens 200 configured to allow light from the light source 140 to be incident on an edge of the aspherical lens 200 and to allow the incident light to travel along the edge of the aspherical lens 200 by reflection.

In this embodiment, the aspherical lens module further includes a locking rim 300 configured to surround the aspherical lens 200. The locking rim may be mounted to the mount hole 120 of the lens holder 100 in such a way that the aspherical lens 200 mounted to the mount hole 120 is locked to the lens holder 100. The locking rim 300 may also be engaged with the lens holder 100 by using a screw or a bolt.

As described above, one embodiment of the present disclosure includes a lens holder 100 and an aspherical lens 200, wherein a locking rim 300 is mounted to the lens holder 100 such that an aspherical lens 200 is locked to the lens holder 100. In this embodiment, the lens holder 100 may serve as a housing of a lamp module containing a low beam or high beam. A main light source (not shown) may also be provided inside the lens holder 100 such that light emitted through the aspherical lens 200 is emitted in a forward direction.

In this embodiment, the mount hole 120 formed through the front surface of the lens holder 100 includes at least one light source 140 along a circumferential surface of the mount hole 120 such that light is emitted to the edge of the aspherical lens 200 mounted to the mount hole 120. In this embodiment, a light emitting diode (LED) may be used as the light source 140. As described above, when the light is emitted directly in line to the edge of the aspherical lens 200, the light incident on the edge travels along the edge of the aspherical lens 200 by reflection. As a result, the edge of the aspherical lens 200 emits light and performs as a position light. Therefore, in this embodiment, it is possible to include a low beam or high beam emitted from a main light source (not shown) provided inside the lens holder 100 as well as a position light emitted at the edge of the aspherical lens 200.

To be more specific, in this embodiment, as shown in FIG. 2, the edge of the aspherical lens 200 may include a light inlet 220 protruding in a radial direction, with the light from the light source 140 being incident on the light inlet 220.

In this embodiment, the light source 140 mounted to the lens holder 100 may emit light in a circumferential direction of the mount hole 120. Also, the light inlet 220 of the aspherical lens 200 may allow the light emitted from the light source 140 to be incident thereon by protruding from the edge of the aspherical lens 200.

As described above, in this embodiment the edge of the aspherical lens 200 is protrudingly formed with the light inlet 220, wherein the light inlet 220 protrudes along a tangent of the aspherical lens 200. In this configuration, light emitted from the light source 140 to a radial direction of the mount hole 120 is easily incident on the light inlet 220. Furthermore, the light incident on the aspherical lens 200 is easily reflected, causing it to travel along the edge of the aspherical lens 200.

In this embodiment, there may be a plurality of light sources 140 adjacently mounted to the lens holder 100 at spaced apart predetermined intervals along the circumferential surface of the mount hole 120. In one embodiment, each light source 140 is spaced apart from adjacent light sources 140 at intervals of 90° around the circumferential surface of the mount hole 120. Accordingly, in this embodiment, the number of light inlets 220 in the edge of the aspherical lens 200 may equal the number of light sources 140 and be spaced apart at the same interval as the light sources 140. As described above, since the lens holder 100 includes a plurality of light sources 140 spaced apart from each other at predetermined intervals, the light incident on the aspherical lens 200 is evenly distributed, which improves esthetic appearance. The configuration in this embodiment also improves visibility by containing a sufficient quantity of light.

In this embodiment, as shown in FIG. 1, the lens holder 100 includes an assembly groove 160 along a circumferential surface of the mount hole 120 to allow insertion of the light inlet 220 of the aspherical lens 200. The assembly groove 160 of the lens holder 100 solves an assembly problem that occurs when the light inlet 220 that protrudes from the edge of the aspherical lens 200 gets caught in the mount hole 120 when the aspherical lens 200 is mounted to the mount hole 120. In this embodiment, it is possible to easily mount the aspherical lens 200 to the lens holder 100 since the light inlet 220 of the aspherical lens 200 is inserted into the assembly groove 160 of the lens holder 100. In addition, the plurality of light sources 140 along a circumferential surface of the mount hole 120 may be disposed in the assembly grooves 160 such that the light is emitted to the light inlets 220 of the aspherical lens 200 mounted to the mount hole 120.

In this embodiment, as shown in FIGS. 2 and 3, the edge of the aspherical lens 200 may include a prism part 240 to scatter the incident light. When the light emitted from the light source 140 is incident through the light inlet 220, the prism part 240 refracts the light to be scattered, thereby improving luminance of the light.

In this embodiment, the prism part 240 is disposed at a location that light from the light source 140 is incident. The prism part 240 may be configured to extend to a predetermined length and be notched from a rear surface thereof toward a front surface thereof to be triangular in shape.

The prism part 240 of the aspherical lens 200 may be provided only at a location where the light from the light source 140 is incident, such that a location where the prism part 240 is not provided is locked between the lens holder 100 and the locking rim 300. The prism part 240 may be configured to extend to a predetermined length along the edge of the aspherical lens 200 and be notched to be triangular in shape. In this configuration, light is reflected by inclined surfaces and refraction occurs.

As shown in FIG. 4, the light incident through the light inlet 220 from the light source 140 of the aspherical lens 200 is reflected by the prism part 240, thereby traveling along the edge of the aspherical lens 200 and being scattered. Accordingly, luminance of the light is improved.

Further, in this embodiment, the edge of the aspherical lens 200 includes a plurality of minute diffusion optic protrusions 260 protruding along the edge of the aspherical lens 200. The light incident through the light inlet 220 is scattered by being reflected against the diffusion optic protrusions 260. Thus, luminance of the light that is emitted through the edge of the aspherical lens 200 is improved.

As described above, the light emitted through the edge of the aspherical lens 200 may perform as a position light. Since the light has sufficient luminance, it may be applied to other lamp functions in addition to securing visibility.

Thus, according to one embodiment of the aspherical lens module of a vehicle headlamp as described above, the position light function is added to the existing functions of a low beam or high beam without increasing the size of the lamp module.

Further, according to one embodiment, the quantity of required light of a low beam or high beam is not reduced when the position light function is added to them.

Although embodiments of the present disclosure have been described for illustrative purposes, those of ordinary skill in the art will appreciate that various modifications, additions and substitutions are possible, without departing from the scope and spirit of the appended claims.

What is claimed is:

1. An aspherical lens module of a vehicle headlamp, the aspherical lens module comprising:
    a lens holder including a mount hole penetrating through a front surface of the lens holder, wherein at least one light source is disposed along a circumferential surface of the mount hole; and
    an aspherical lens configured to be mounted to the mount hole of the lens holder, the aspherical lens configured to allow light from the at least one light source to be incident on an edge of the aspherical lens and to allow the incident light to travel along the edge of the aspherical lens by reflection,
    wherein the edge of the aspherical lens includes a prism part to scatter the incident light,
    wherein the prism part is disposed at a location along the edge of the aspherical lens upon which the light from the light source is incident, and
    wherein the prism part is configured to extend to a predetermined length and be notched from a rear surface thereof toward a front surface thereof to be triangular in shape.

2. The aspherical lens module of claim 1, wherein
    the edge of the aspherical lens includes at least one light inlet protruding in a radial direction, wherein the light from the light source being incident on the light inlet.

3. The aspherical lens module of claim 2, wherein
    the light source is provided to emit light in a circumferential direction of the mount hole; and
    the light inlet allows the light emitted from the light source to be incident thereon by protruding from the edge of the aspherical lens.

4. The aspherical lens module of claim 2, wherein
    the lens holder includes an assembly groove along a circumferential surface of the mount hole configured to allow insertion of the light inlet of the aspherical lens.

5. The aspherical lens module of claim 1, wherein
    the edge of the aspherical lens includes a plurality of diffusion optic protrusions protruding along the edge of the aspherical lens.

6. The aspherical lens module of claim 1, further comprising:
    a locking rim configured to be mounted to the mount hole of the lens holder and configured to surround the aspherical lens, wherein the aspherical lens is locked to the lens holder by the locking rim.

* * * * *